H. LANGHAM.
EGG TESTER.
APPLICATION FILED APR. 22, 1908.
933,185.
Patented Sept. 7, 1909.
2 SHEETS—SHEET 1.
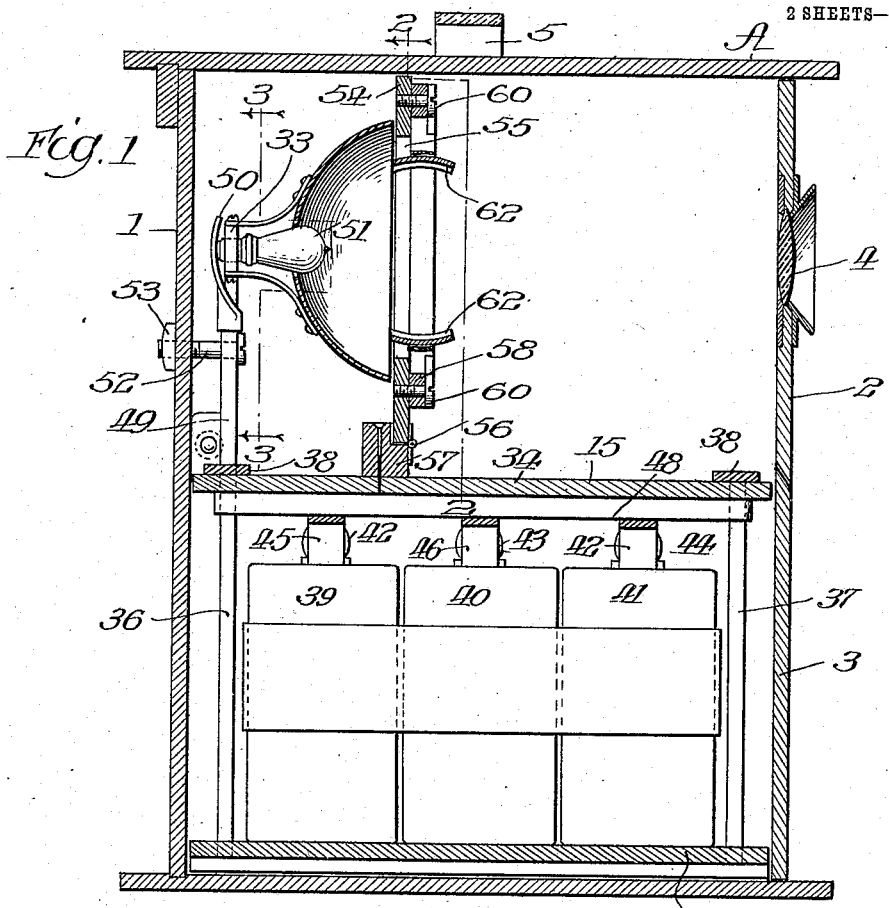
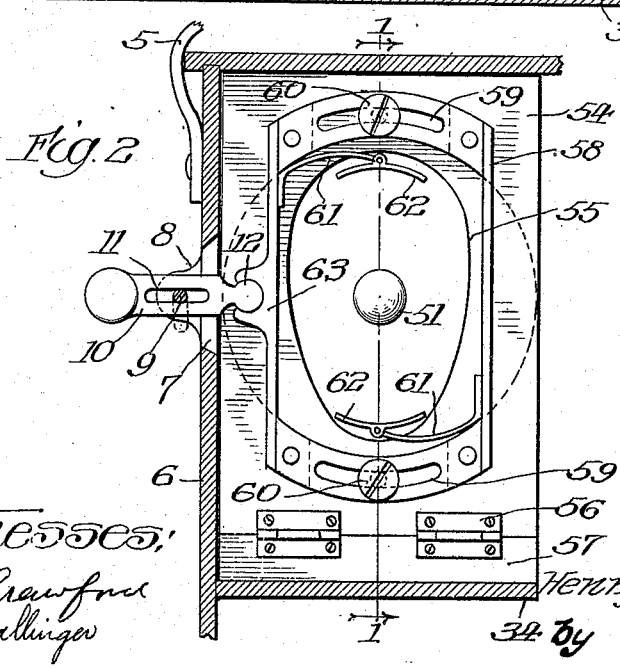
Witnesses:
C. M. Crawford
E. Schallinger
Inventor:
Henry Langham
by B. Singer
Atty.

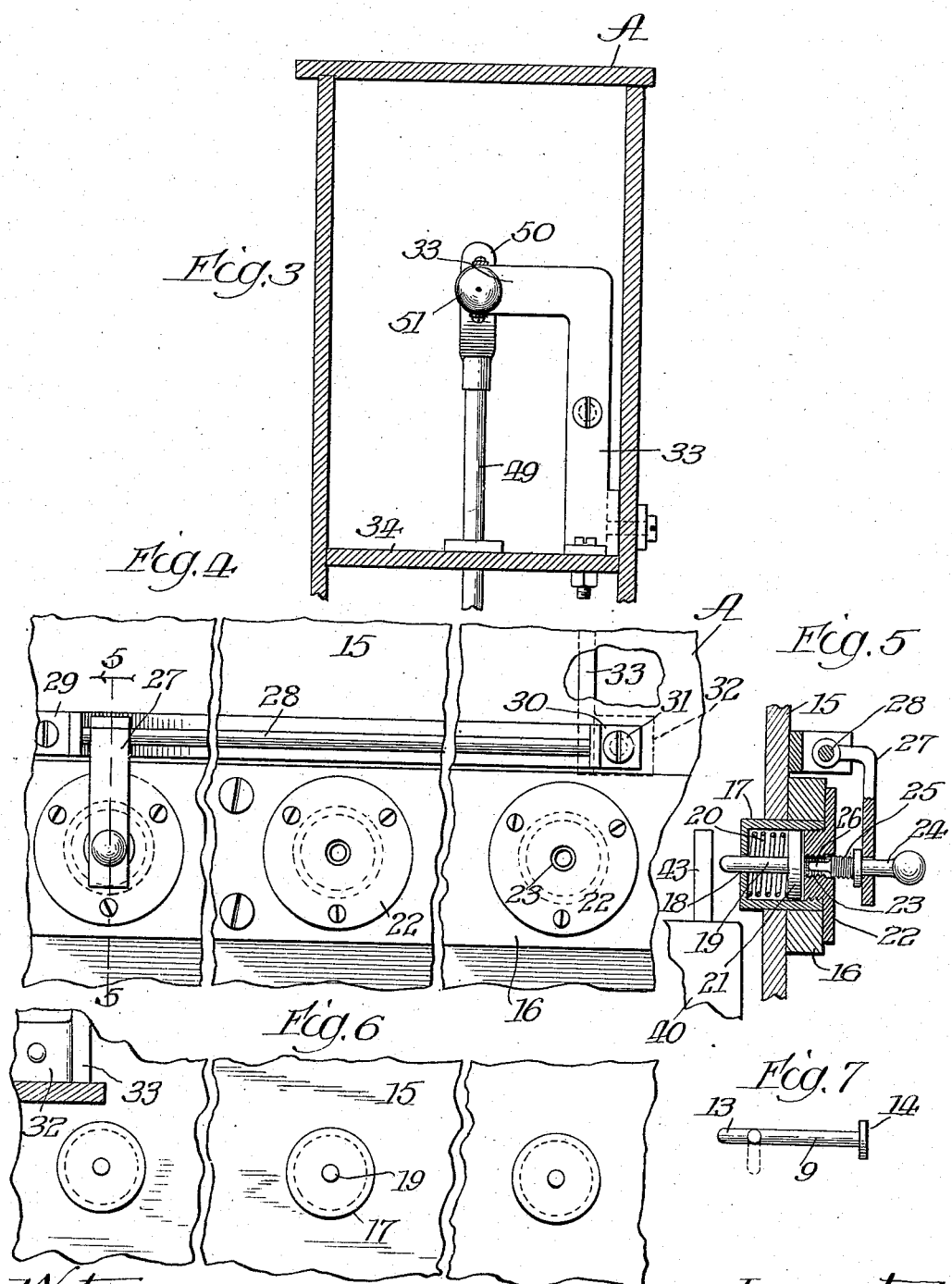

UNITED STATES PATENT OFFICE.

HENRY LANGHAM, OF HODDESDON, ENGLAND.

EGG-TESTER.

933,185.  Specification of Letters Patent.  Patented Sept. 7, 1909.

Application filed April 22, 1908. Serial No. 428,608.

*To all whom it may concern:*

Be it known that I, HENRY LANGHAM, a subject of the King of Great Britain, resident at Guernsey Cottage, Rye Park, Hoddesdon, Hertfordshire, England, have invented an Egg-Tester.

This invention relates to egg testers and is adapted for use in testing eggs for incubation or culinary purposes.

One of the objects of the invention is to provide a simple and convenient egg holder in which the eggs can be readily inserted and withdrawn and by means of which the egg may be moved or shifted during the tested operation so as to more readily and definitely ascertain the condition of the yolk.

The invention also has for its object the provision of an electric lamp for testing the eggs and the invention includes an improved construction whereby the lamp may be made to glow when desired.

The invention will be more fully described in connection with the accompanying drawings and will be more particularly pointed out and ascertained in and by the appended claims.

In the drawings:—Figure 1 is a vertical sectional view on line 1—1 of Fig. 2, showing the entire structure of an egg tester embodying the main features of my invention. Fig. 2 is a sectional view on line 2—2 of Fig. 1. Fig. 3 is a sectional view on line 3—3 of Fig. 1. Fig. 4 is a fragmentary elevation of a portion of the outside wall showing the contact mechanism. Fig. 5 is a sectional view on line 5—5 of Fig. 4. Fig. 6 is an inside view of the contact mechanism. Fig. 7 is a detail view of a pivot pin employed as a detail of construction in my improved tester.

Referring to the specific construction shown in the drawings, which illustrate one embodiment of my invention, a casing 1 is provided having doors 2 and 3. A lens 4 is disposed in the door 2 for the purpose of observing the egg during the testing operation. A suitable handle, as indicated at 5, may be provided for carrying the tester from place to place as desired. One wall of the casing is slotted to receive a shifting member the function of which is to shift the egg holder so that the operator can observe the condition of the yolk in various positions to which the egg may be adjusted. As shown the wall 6 is slotted at 7 and supports in the form of ears 8 are disposed adjacent said slot to receive a pivot pin 9. A shifting member in the form of a lever 10 is provided which is slotted at 11 and is provided on its inner end with an engaging portion 12. The pin 9 extends through the ears and the slot 11 of the shifting member 10 and is provided with a pivotally mounted locking end 13 so that when the pin is inserted in place it will be held by the end 14 and the locking member 13. It will be obvious that this mounting of the shifting member will permit the same to be rocked vertically on the pin 9 and to also move longitudinally with respect to said pin.

In the opposite wall 15 of the casing a plurality of plunger contacts is provided to close and open circuit with the testing lamp and preferably said contacts are so arranged as to be thrown into electrical connection with one of a plurality of cells so that when one cell is out of service for any reason one of the remaining cells may be used without interrupting the testing operation.

As shown a supporting strip 16 is disposed on the outer base of the wall 15 and a plurality of bushings, preferably three in number, and indicated at 17 are inserted through openings formed in said strip and the wall 15 in a manner to project into the casing 1. The inner walls of the bushings 17 are apertured at 18 to accommodate the plunger contacts 19 which project through said bushings into engagement with cell contacts hereinafter described. Springs 20 are interposed between the inner walls of the bushings 17 and the head 21 of the plunger contacts 19 so as to hold the latter in a retracted position. Caps 22 are threaded into the bushings 17 to limit rearward movement of the plunger contacts 19 and said caps 22 are provided with threaded apertures 23. An actuator 24 is provided for throwing said plunger contacts into electrical connection with the cell contacts, as will hereinafter more fully appear, and as shown said actuator is provided with a threaded portion 25 adapted for engagement with the threaded aperture 23 and an extension 26 adapted to engage a plunger 19 to force it inwardly against the action of the spring 20. When the actuator is turned into threaded engagement with the aperture 23 the selected plunger 19 will be locked in engagement with its coöperating part. In order to enable the operator to bring the actuator 24 into registry with any one of the three caps 22 and to enable the actuator to act as a part of the circuit a supporting arm 27 is provided for carrying the actuator 24 and said arm is mounted upon a rod 28 anchored in brackets 29 and 30. By grafting the actuator 24 the arm 27 may be moved along the rod 28 into a position of rest of any one of the caps 22. A fastening device which may comprise a screw 31 serves to support the bracket 30 in place and is adapted for threaded engagement with an apertured base 32 of a lamp supporting arm 33.

Reference will next be made to the internal mechanism of the casing 1 and the manner in which the same operates.

As shown a frame is provided which consists of upper and lower members 34 and 35 respectively, and which are mounted and connected respectively upon uprights 36 and 37. The upper member 34 may be held in place upon the supporting upright by nuts 38 as shown. In cases where more than one battery is used the space between said members affords a convenient receiver for the cells 39, 40 and 41. The poles 42, 43 and 44 of said cells are in the form of cell contact disks which are so positioned as to be opposite the contact plungers 19 when the frame is in position in the casing 1. The springs 20 will normally maintain the plunger contacts out of engagement with the cell disks until the actuator is inserted in one of the caps, as hereinbefore set forth. The remaining poles of the cells are in the form of contacts indicated at 45, 46, and 47, said contacts are normally engaged with a conducting strip 48 which is electrically connected with the upright 36. The upright 36 is provided with an extension 49 having a yielding lamp engaging terminal 50 adapted for electrical connection with one terminal with the lamp 51. The lamp supporting arm 33 sustains the lamp 51, in position, and in connection with the other terminal thereof and the upper end of said support 33, is preferably formed of yielding material so that it may be held rearwardly in a manner to insure engagement of one terminal of the lamp with the terminal 50. When the frame is inserted in the casing 1 a screw 52 mounted in the arm 33 projects through the casing 1 and is engaged by a nut 53, on the outside of the casing 1, so that when the nut 53 is tightened the arm 33 will be drawn rearwardly to maintain engagement of the lamp with the terminal 52.

A partition 54 is interposed between the lamp and the lens and is provided with an opening 55 and serves to divide the upper portion of the casing into two separate compartments. When desired the partition 54 may be hinged at 56 to a ledge 57 which latter may be mounted upon the upper frame member 34. An egg holder is provided which as shown comprises a frame 58, desirably mounted upon the partition 54. A movable mounting is provided for said frame and as shown the same is slotted at 59 and is adapted to be oscillated upon studs 60, secured to the partition 54. Spring arms 61 are secured to said frame and are provided with egg holding or engaging members 62 between which the egg may be inserted and held abreast of the opening 55 so that the rays of light emitted from the lamp will project through the egg and permit the yolk to be observed through the lens. A lug 63 is provided on the frame and is recessed to receive the enlarged end 12 of the shifting member 10, when the partition 54 is in an upright position. It will be readily seen that when the lever 10 is oscillated it will shift or oscillate the frame 58 so as to more readily enable the operator to determine the exact condition of the yolk. It will also be observed that the frame 58 can be readily detached and attached from and to the shifting member 10 to permit the partition to be lowered or raised in withdrawing or inserting the frame in the casing 1.

It will be readily seen that instrumentalities are provided constituting a circuit in which is included a source of current, a lamp and switching mechanism or plungers, the current passing from either of the poles 45 to 47 to the strips or conductors 48 through extension 49 to the spring terminal 50 and thence to the lamp 51, through one of its terminals. The other terminal of the lamp being connected with the support 33 the current will flow through said support and the fastening device 31 to the rod 28 and down the arm 27 to actuator 24 and one of the plungers 19 to one of the poles indicated by the disks 42 to 44 inclusive, which will complete the circuit. By providing three cells it will be readily seen that when one becomes exhausted either of the others may be put into service without injuriously delaying the testing operation.

I claim:—

1. An egg tester comprising in combination, a casing provided with a shifting member and a lens, said casing having a plurality of plunger contacts projecting therethrough, a slidable actuator for said contacts, a mounting for said actuator, a fastening member electrically connected with said mounting and projecting into said casing, a frame located in said casing, a plurality of cells disposed on said frame and having contacts adapted for engagement with said plunger contacts, said cells having other contacts, a bar electrically connected with said other contacts, an opaque partition hinged on said frame and dividing said casing into separate compartments, an egg holder movably mounted on said frame and operatively connected with said shifting member, a light deflector disposed on that side of said partition remote from said lens, and a lamp adjacent said deflector, said lamp being electrically connected with said bar and fastening device.

2. An egg tester comprising in combination, a casing provided with a lens, said casing having a plurality of plunger contacts projecting therethrough, a slidable actuator for said contacts, a mounting for said actuator, a fastening member electrically connected with said mounting and projecting into said casing, a frame located in said casing, a plurality of cells disposed on said frame and having contacts adapted for engagement with said plunger contacts, said cells having other contacts, a bar electrically connected with said other contacts, an opaque partition mounted on said frame, an egg holder movably mounted on said partition, means for moving said egg holder, a light deflector disposed on said partition, and a lamp adjacent said deflector, said lamp being electrically connected with said bar and fastening device.

3. An egg tester comprising in combination, a casing provided with a plunger contact projecting therethrough, an actuator for said contact, a frame located in said casing, a cell disposed on said frame and provided with a contact adapted for engagement with said plunger contact, a partition mounted on said frame, an egg holder movably mounted on said partiton, means for adjusting said egg holder from the exterior of said casing, a deflector, and a lamp adjacent said deflector, and instrumentalities for completing an electrical circuit between said contact plunger and lamp and the remaining poles of said cell.

4. An egg tester comprising in combination, a casing provided with a lens, a frame disposed in said casing, a source of current for said casing, a partition mounted on said frame, an egg holder movably mounted on said partition, a deflector and lamp for said partition, electrical conducting means connecting said source of current and lamp in a circuit, and means operable from the exterior of said casing for closing and opening said circuit.

5. An egg tester comprising in combination, a normally stationary element provided with an opening, egg supporting means serving to hold an egg abreast of said opening and including mechanism for permitting oscillation and preventing rotation thereof, and a device for oscillating said means.

6. An egg tester comprising in combination, a normally stationary element provided with an opening, egg supporting means serving to hold an egg abreast of said opening and including mechanism for permitting oscillation and preventing rotation thereof, and a device for oscillating said means to shift said egg about a center coincident with the center of said opening.

7. An egg tester comprising in combination, a casing, a partition dividing said casing into separate compartments and provided with an opening, egg supporting means on said partition holding said egg abreast of said opening and including mechanism for permitting oscillation and preventing rotation of said means, and a device mounted on said casing detachably connected with said means for oscillating the same about a center coincident with the center of said opening.

HENRY LANGHAM. [L. S.]

Witnesses:
ARTHUR ASHFORD,
EDWIN HARRY SHEARMAN.